United States Patent
Chou

(10) Patent No.: US 7,270,461 B2
(45) Date of Patent: Sep. 18, 2007

(54) BACKLIGHT UNIT AND LIQUID CRYSTAL DISPLAY UTILIZING THE SAME

(75) Inventor: Shen-Hong Chou, Kaohsiung (TW)

(73) Assignee: Au Optronics Corp., Hsinchu (TW)

( * ) Notice: Subject to any disclaimer, the term of this patent is extended or adjusted under 35 U.S.C. 154(b) by 145 days.

(21) Appl. No.: 10/769,966

(22) Filed: Feb. 2, 2004

(65) Prior Publication Data

US 2005/0169007 A1    Aug. 4, 2005

(51) Int. Cl.
*F21V 7/04* (2006.01)
(52) U.S. Cl. .................... 362/600; 362/26; 362/27; 362/601; 362/607; 362/611; 362/555; 362/559; 362/561
(58) Field of Classification Search .............. 362/600, 362/26, 27, 601, 607, 611, 612, 555, 559, 362/561; 385/146; 349/64, 65, 61–63, 70
See application file for complete search history.

(56) References Cited

U.S. PATENT DOCUMENTS

| | | | | |
|---|---|---|---|---|
| 4,125,319 A | * | 11/1978 | Frank et al. | 359/296 |
| 6,486,923 B1 | * | 11/2002 | Maeshima et al. | 348/649 |
| 6,856,087 B2 | * | 2/2005 | Lin et al. | 313/500 |
| 2002/0071288 A1 | | 6/2002 | Lim | |
| 2002/0159002 A1 | | 10/2002 | Chang | 349/61 |
| 2004/0196374 A1 | * | 10/2004 | Billerbeck | 348/207.1 |

* cited by examiner

*Primary Examiner*—Stephen F. Husar
*Assistant Examiner*—Mark Tsidulko
(74) *Attorney, Agent, or Firm*—Thomas, Kayden, Horstemeyer & Risley

(57) ABSTRACT

A backlight unit for a liquid crystal display. The backlight unit in a liquid crystal display includes a light source having a plurality of basic cell structures. Each basic cell structure consists of three unique colors of first, second, and third light emitting diodes, arranged in a first equilateral triangle. An LCD utilizing the backlight unit is also disclosed.

10 Claims, 8 Drawing Sheets

BACKLIGHT UNIT AND LIQUID CRYSTAL DISPLAY UTILIZING THE SAME

BACKGROUND OF THE INVENTION

1. Field of the Invention

The present invention relates to a backlight unit and a liquid crystal display, and in particular to a backlight unit consisting of red, green, and blue (RGB) light emitting diodes (LEDs) on a planar surface.

2. Description of the Related Art

Liquid crystal displays (LCDs) are used in a variety of electronic devices, including notebook and desktop computer monitors, mobile phones, car navigation systems, and TVs. In the conventional design, backlight units provide the main light source for LCDs. Direct backlight and edge-light technologies are employed, both of which use a cold cathode fluorescent lamp (CCFL) as the light source, particularly a white light source.

FIGS. 1A and 1B are schematic exploded views of a conventional direct backlight unit 10a and an edge lighting unit 1ob for a liquid crystal display. In FIG. 1A, the direct backlight unit 10a comprises at least a light source 11, a dispersion sheet 12a, a light-control sheet 12b, a reflector 13, and a frame 14. The direct backlight unit 10a locates the light source 11 between the light-control sheet 12b and the reflector 13. The light source 11 produces light, which is then reflected by the reflector 13 and diffused through the dispersion sheet 12a, providing desired color merged by the light-control sheet 12b. The direct backlight unit 10a is generally suitable for multicolor or dot matrix LCDs with larger screens.

In FIG. 1B, the edge lighting unit 1ob has at least one light source 11' located along the edge of the light guide panel 17. A prism sheet 15 and a dispersion sheet 16 are disposed above the light guide panel 17. A reflector 13' is located behind the light guide panel 17. Generally, the edge lighting unit 1ob provides less expensive lighting, especially for smaller LCDs. In addition, the edge lighting unit 10b offers a thinner package with lower power consumption, however, usually with lower light intensity.

Obviously, either size or brightness of the direct backlight 10a or edge lighting backlight 1ob is limited by the size of CCFL. Thus, other types of light source are considered to replace the CCFL. It is known that light emitting diode (LED) backlights offer a brighter and longer operating life of 50,000 hours minimum than other light sources such as CCFL with a life of 10,000 to 15,000 hours or electroluminescent (EL) with a limited life of 3,000 to 5,000 hours. Thus, compared to the conventional backlights using CCFL or EL, LEDs are less expensive, last longer, and smaller in size, contributing to a more robust design, and provide a higher brightness-to-size ratio. LEDs provide a variety of colors such as red (R), green (G) and blue (B) and consequently, must be mounted in an array directly behind the display to provide white light. Also LEDs are more compact than CCFL. If LEDs can be arranged to provide the brightest, whitest light, LEDs can also have the potential to provide excellent light source for all types of LCDs. However, a slight difference in arrangement of the LEDs can adversely affect the color and brightness of the display due to the combination of various colors. Hence, there is a need for a specific arrangement of the LEDs that can provide true white light in a backlight unit.

SUMMARY OF THE INVENTION

Thus, an object of the invention is to provide a backlight unit comprises red, green, and blue (RGB) light emitting diodes (LEDs) on a planar surface in a specific arrangement such that the backlight unit provides light as bright and white as possible.

The present invention provides a backlight unit for a liquid crystal display including a light source having a plurality of basic cell structures. Each basic cell structure comprises three unique colors of first, second, and third light emitting diodes, arranged in a first equilateral triangle.

The invention also provides an LCD utilizing the backlight unit.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
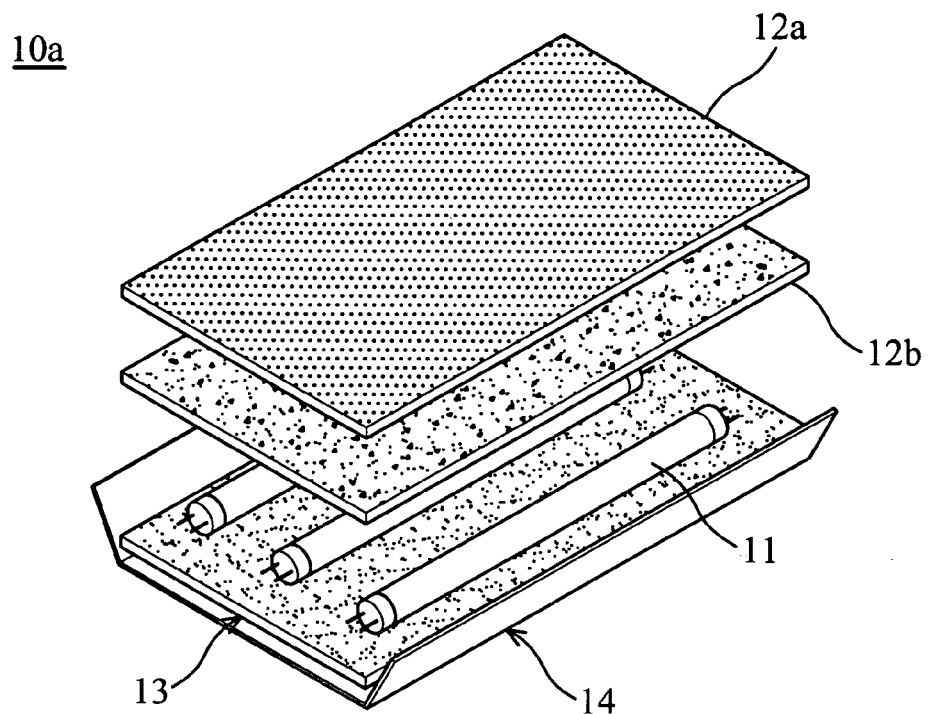
FIG. 1A is a schematic exploded view of a conventional direct backlight unit of a liquid crystal display.
Figure 1B:
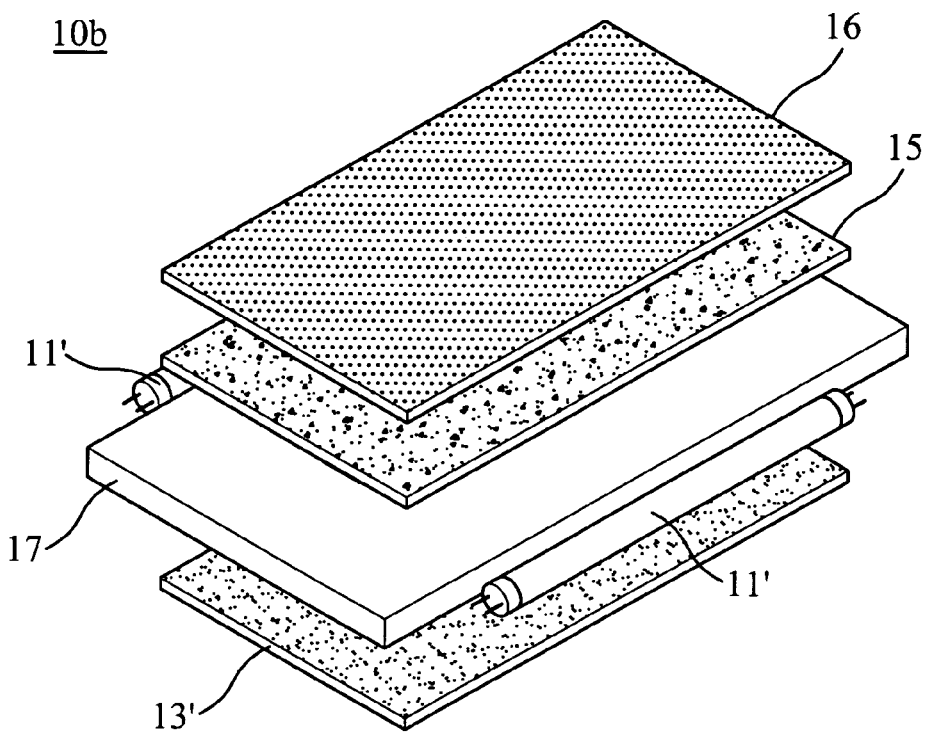
FIG. 1B is a schematic exploded view of a conventional edge lighting unit of a liquid crystal display.
Figure 2A:
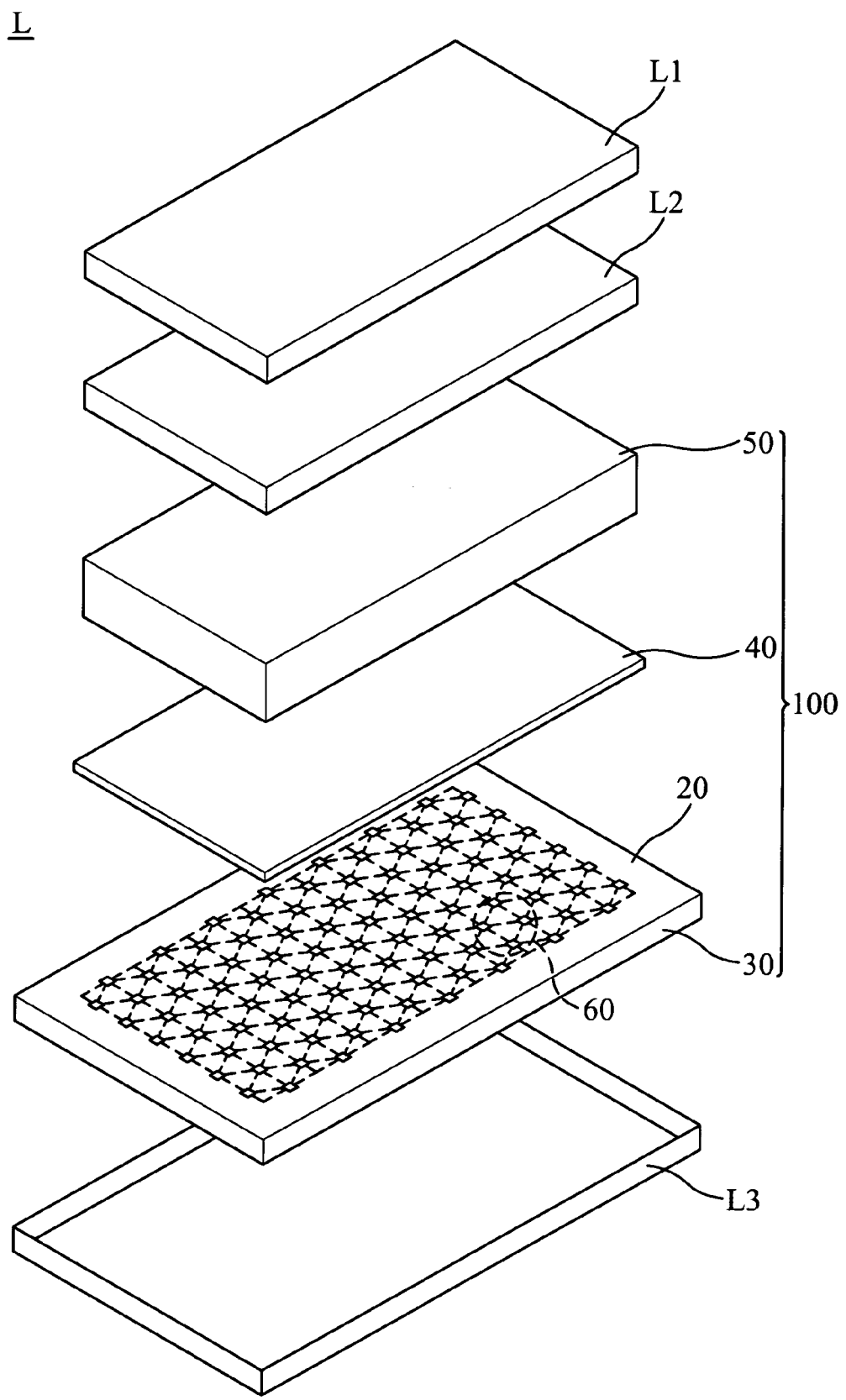
FIG. 2A is a schematic exploded view of a liquid crystal display having a backlight unit according to the present invention.
Figure 2B:
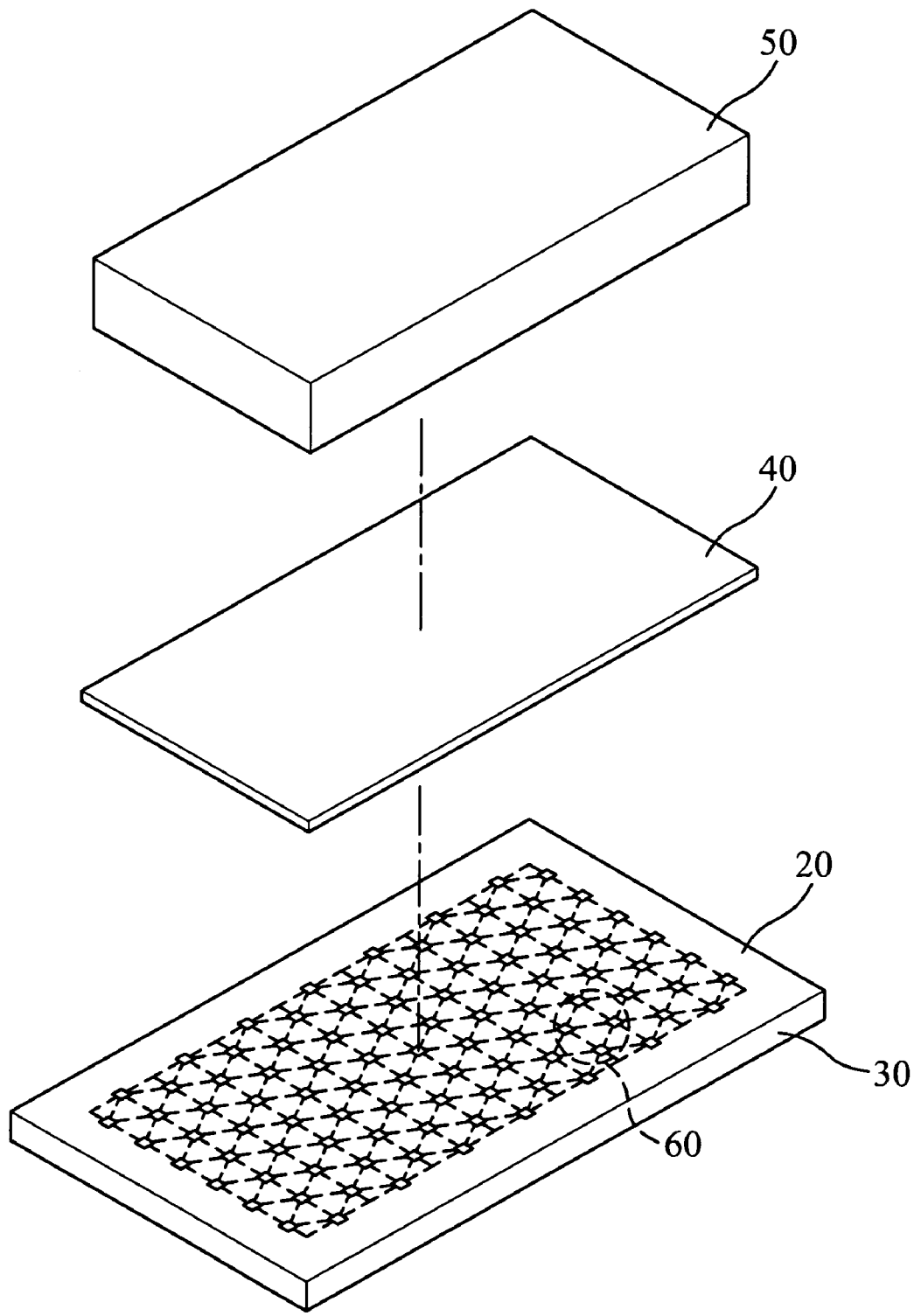
FIG. 2B is a schematic exploded view of a backlight unit of a liquid crystal display according to the present invention.

FIG. 2A is a schematic exploded view of a liquid crystal display having a backlight unit 100 according to the present invention. The liquid crystal display L comprises a front frame L1, a panel L2, a backlight unit 100 and a rear frame L3. FIG. 2B is a schematic exploded view of the backlight unit 100.

Figure 2C:
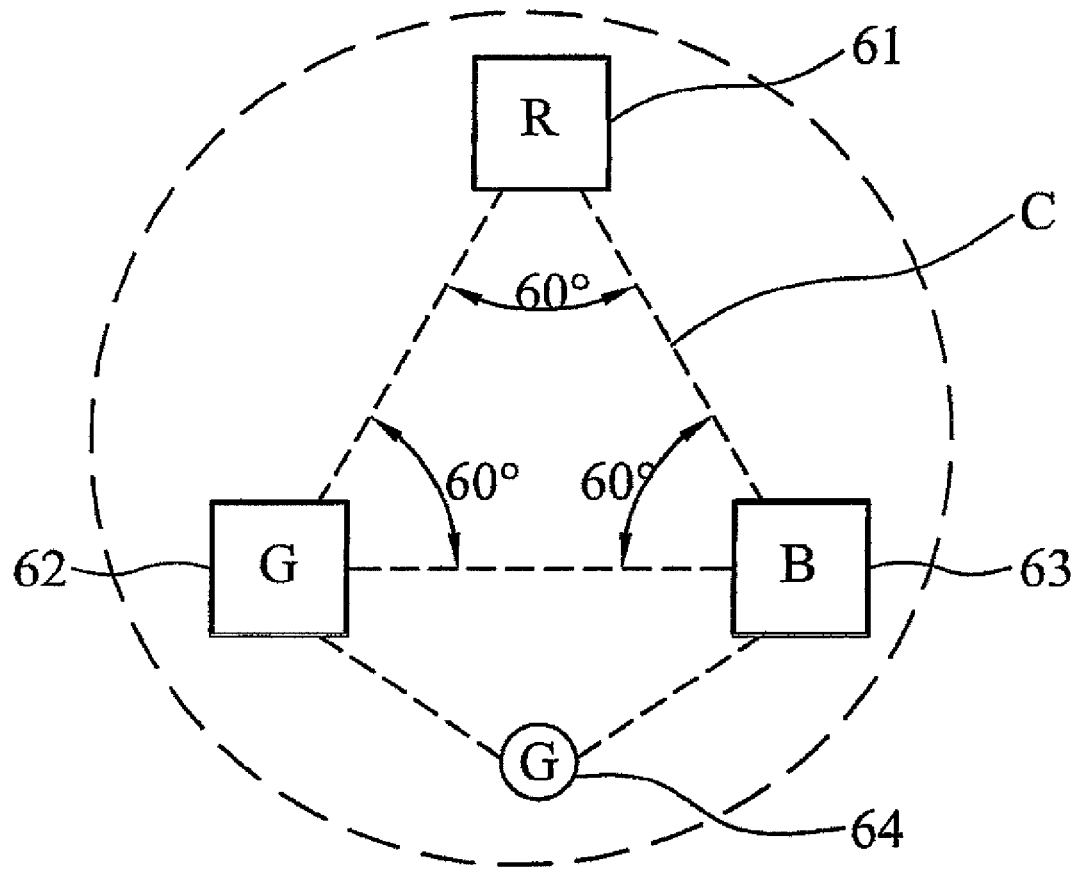
FIG. 2C is a schematic view of a basic cell structure consisting of red, green, and blue LEDs according to the present invention.

FIG. 2C is a schematic view of a basic cell structure 60 consisting of first, second and third LEDs 61, 62, 63 according to the present invention. The present invention utilizes the backlight unit 100 for all types of liquid crystal displays including a dispersion device 50, a light controlling device 40, a light source 20 and a planar surface 30. The light source 20 is disposed on the planar surface 30. The dispersion device 50 and the light controlling device 40 are disposed above the light source controlling light produced from the light source 20. The light source 20 has a plurality of basic cell structures 60. One of the basic cell structures 60 is shown in FIG. 2B. Each basic cell structure 60 comprises three unique colors of first, second, and third light emitting diodes 61, 62, and 63, and an adjacent light emitting diode 64, arranged in a quadrilateral (shown in FIG. 3B). Namely, the locations of three LEDs 61, 62, and 63 are arranged to form an equilateral triangle configuration in which all angles are congruent. In this basic cell structure 60, the first LED 61 is red, the second LED is green, and the third LED is blue.

A detailed description of different arrangements of the basic cell structures 60 and color mixing pattern thereof is provided in the following.

As mentioned above, each LED produces one or more colors. The light source 20 of the present invention produces white light. Thus, two specific arrangements in two embodiments are provided in the present invention such that light from different LEDs can be thoroughly merged, producing light as bright and as white as possible.

Figure 3A:
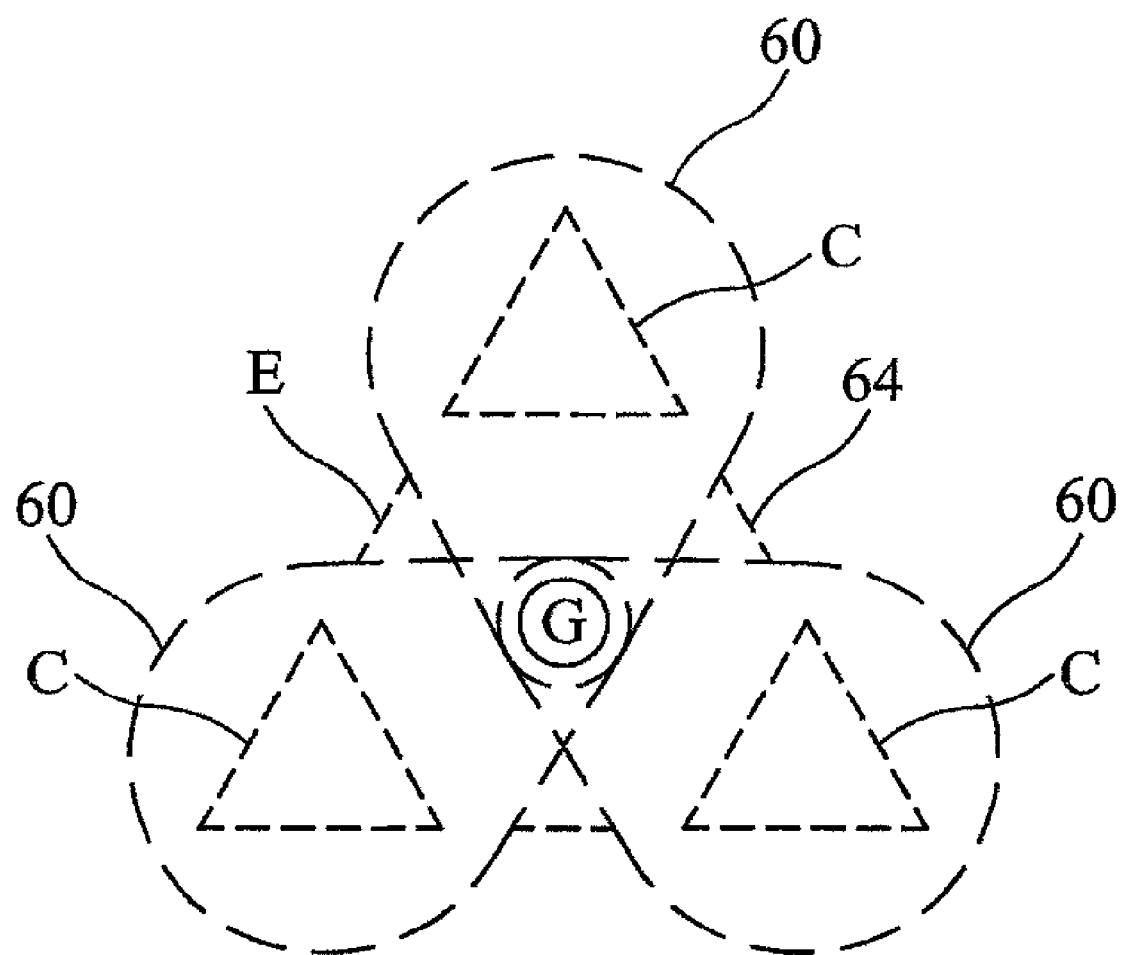
FIG. 3A is a schematic view showing the second arrangement of basic cell structures according to the second embodiment of the present invention.
Figure 3B:
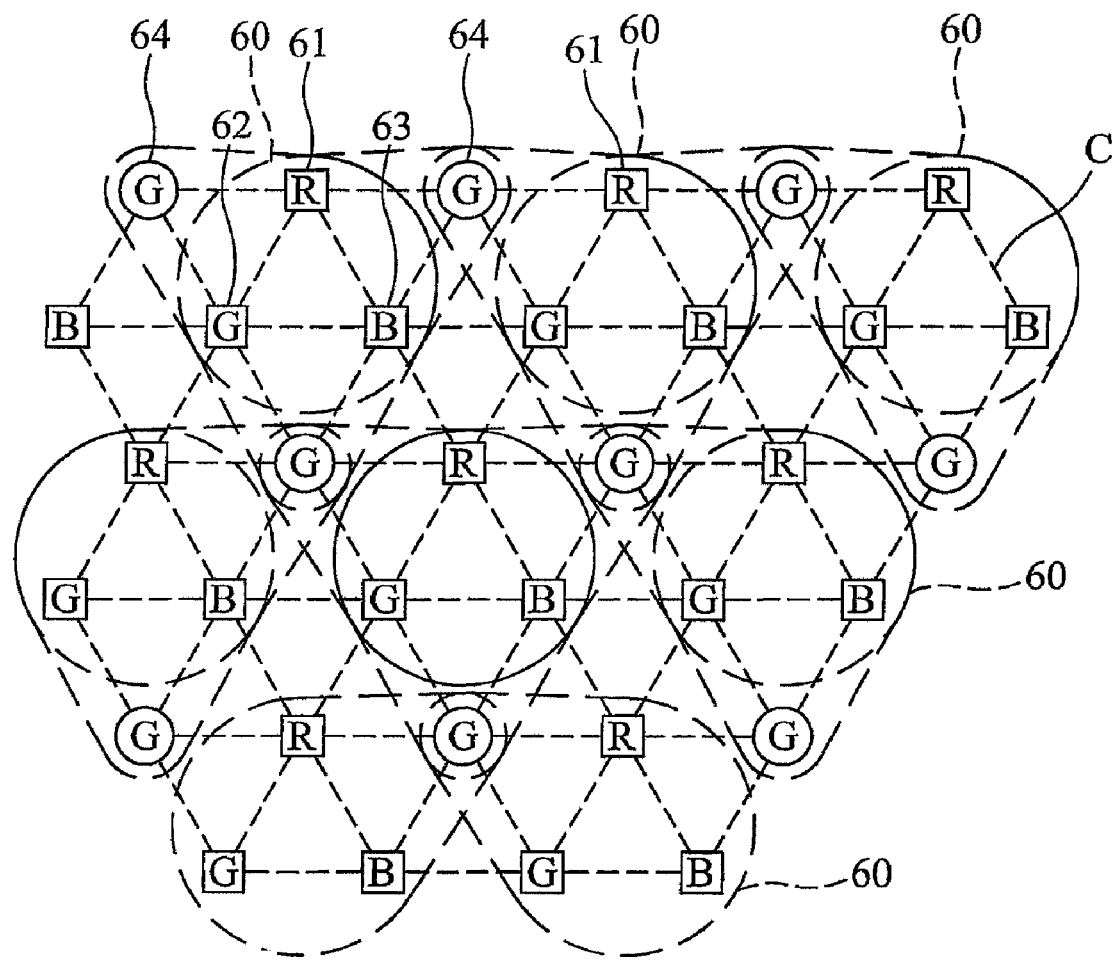
FIG. 3B is a schematic view of the LEDs according to the second embodiment.
Figure 4A:
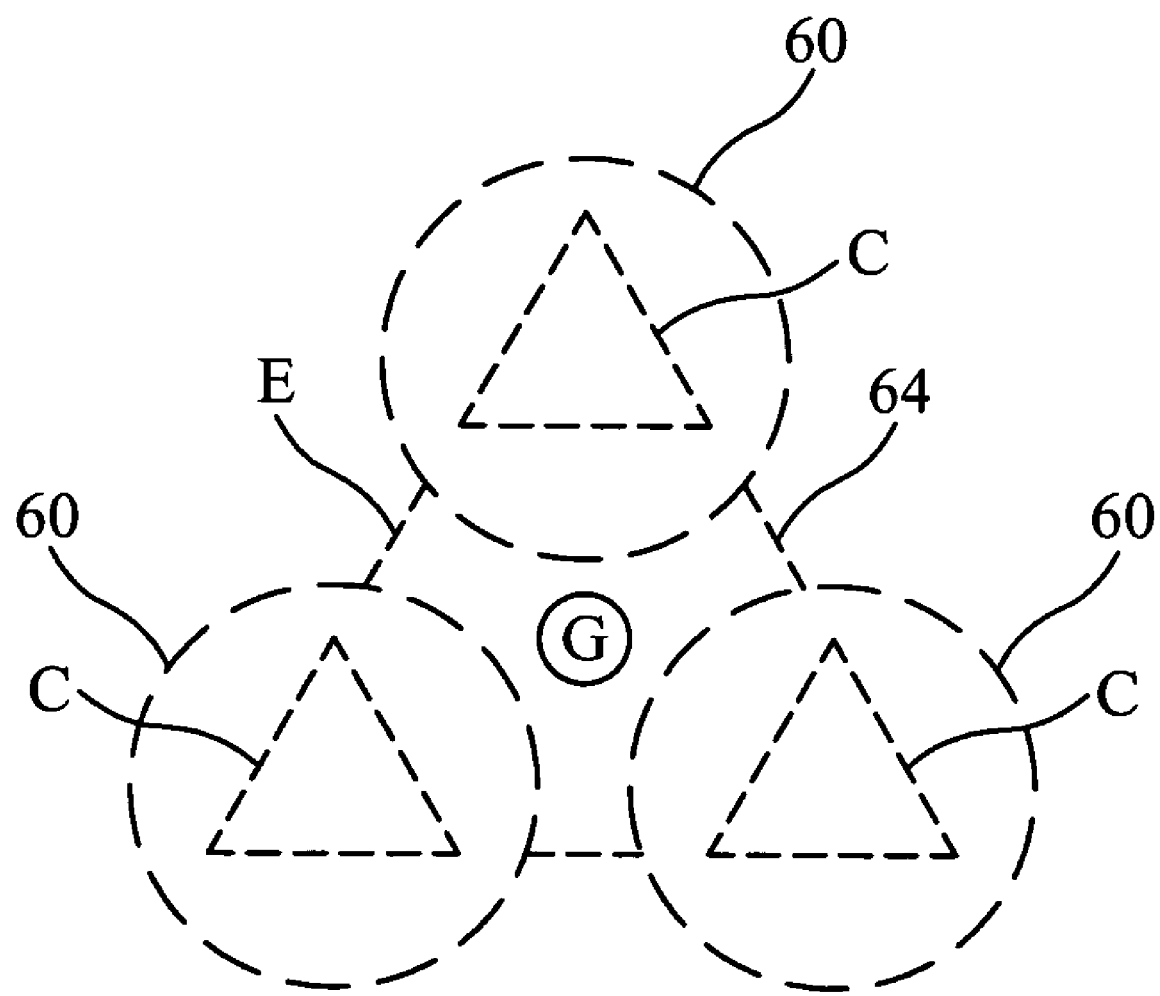
FIG. 4A is a schematic view showing the second arrangement of basic cell structures according to the second embodiment of the present invention.
Figure 4B:
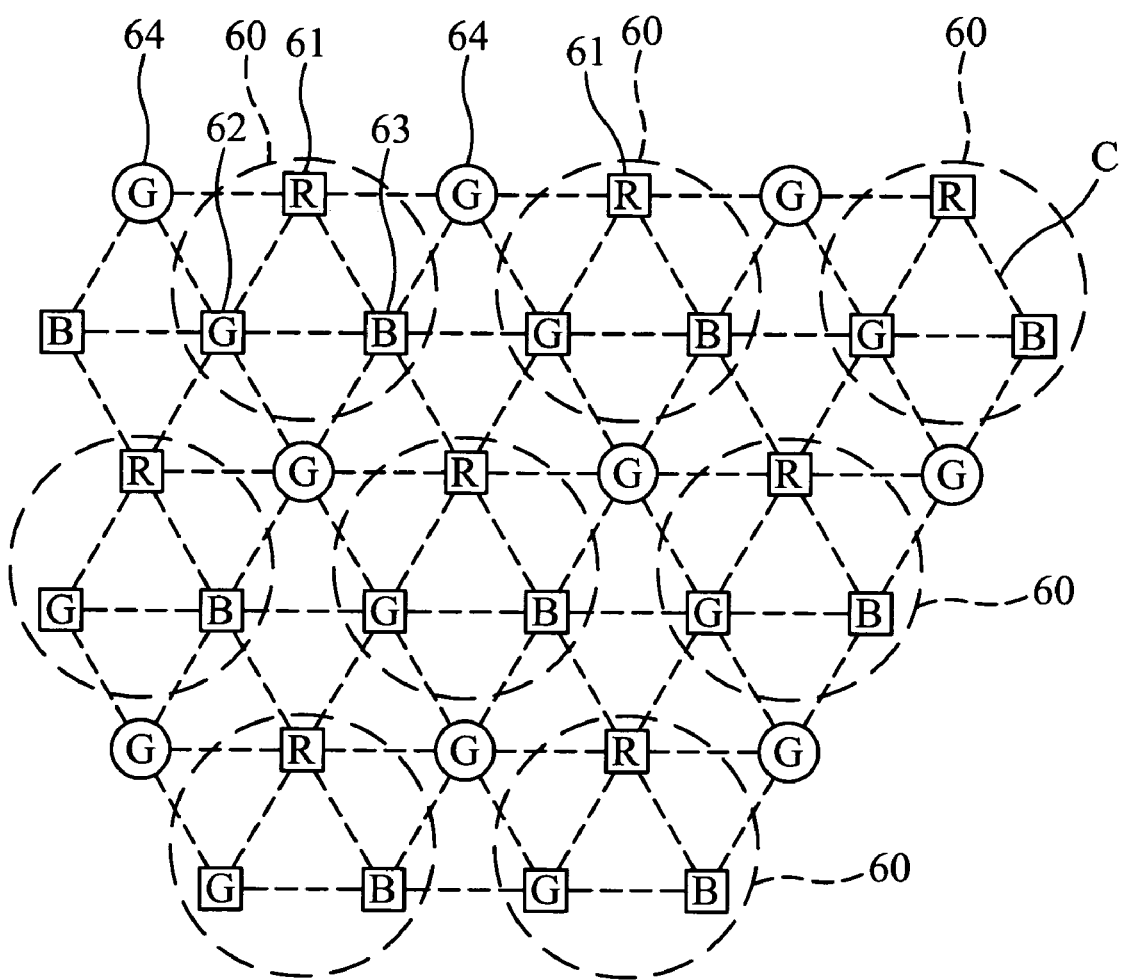
FIG. 4B is a schematic view of the LEDs according to the second embodiment.

A second LED arrangement is shown in FIGS. 3A and 3B. FIG. 3A is a schematic view showing the second arrangement of basic cell structures 60 according to the second embodiment of the present invention. FIG. 3B is a schematic view of the LEDs 61, 62, 63 according to the second embodiment. As shown in FIG. 3A three of the basic cell structures 60 are arranged in another equilateral triangle E. Unlike the first embodiment, an additional fourth LED 64 in green color is disposed in the center of the second equilateral triangle F. It should be noted that the LEDs 62 and 64 are both green. In addition, in this figure, the triangle center is an incenter, an intersection point of three internal angle bisectors on the triangle E.

In the first row of FIG. 3B from left to right, the LEDs 64, 61 are arranged in a sequence as follows: G, R, G, R, G, R and so on. The LEDs 62, 63 in the second row are arranged differently in a sequence of BG. Each red LED 61 in the first row and two adjacent LEDs 62, 63 in the second row, G and B LEDs are arranged in the first equilateral triangle C as shown in FIG. 2B. Thus, three LEDs 61, 62, and 63 on the planar surface 30 are formed into the first equilateral triangle C, representing one basic cell structure 60.

In addition, in the second embodiment, in FIG. 3B the total quantities of red, the blue, and green LEDs 61, 62, 63, 64 on the planar surface 30 are in a ratio of 1:1:2. As a result, the power is equally supplied to each LED. Thus, in the second embodiment, the power to each of the LEDs 61, 62, 63, 64 should be equivalent, while providing double amounts of green LEDs.

The present invention provides various advantages. Compared to conventional backlights that use CCFL or EL, backlight units with LEDs as light source are less expensive, last longer, and are smaller in size, contributing to a more robust and compact design and providing a higher brightness-to-size ratio. Specifically, the specific LEDs 61, 62, 63 arrangement according to the first and second embodiments can generate high light intensity, thus producing high quality images on the LCD display.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight unit for a liquid crystal display, comprising:
a light source comprising:
a plurality of basic cell structures, wherein each basic cell structure, comprising:
three unique colors of first, second and third light emitting diodes; and
an adjacent light emitting diode;
wherein the first, second and third light emitting diode and the adjacent light emitting diode are arranged in a quadrilateral;
wherein the adjacent light emitting diode and one of the first, second and third light emitting diodes are green;
wherein when the adjacent light emitting diode is considered as a center, each three adjacent basic cell structures form a triangle; and
in two of three adjacent basic cell structures, the adjacent light emitting diode is adjacent to the green light emitting diode.

2. The backlight unit as claimed in claim 1, wherein the first light emitting diode is red, the second and the adjacent light emitting diodes are green and the third light emitting diode is blue.

3. The backlight unit as claimed in claim 2, wherein intensity of the light produced by the basic cell structures is varied by varying power to one of the light emitting diodes.

4. The backlight unit as claimed in claim 1, further comprising a planar surface, on which the light source is disposed.

5. The backlight unit as claimed in claim 1, further comprising a dispersion device and a light controlling device, provided above the light source to control produced light.

6. A liquid crystal display, comprising:
a backlight unit; and
a light source comprising:
a plurality of basic cell structures, wherein each basic cell structure, comprising:
three unique colors of first, second, and third light emitting diodes; and
an adjacent light emitting diode;
wherein the first, second and third light emitting diode and the adjacent light emitting diode are arranged in a quadrilateral;
wherein the adjacent light emitting diode and one of the first, second and third light emitting diodes are green;
wherein when the adjacent light emitting diode is considered as a center, each three adjacent basic cell structures form a triangle; and
in two of three adjacent basic cell structures, the adjacent light emitting diode is adjacent to the green light emitting diode.

7. The liquid crystal display as claimed in claim 6, wherein the first light emitting diode is red, the second and the adjacent light emitting diodes are green and the third light emitting diode is blue.

8. The liquid crystal display as claimed in claim 7, wherein intensity of the light produced by the basic cell structures is varied by varying power to one of the light emitting diodes.

9. The liquid crystal display as claimed in claim 6, further comprising a planar surface, on which the light source is disposed.

10. The liquid crystal display as claimed in claim 6, further comprising a dispersion device and a light controlling device, provided above the light source to control produced light.

* * * * *